(12) United States Patent
Ejima et al.

(10) Patent No.: US 7,898,715 B2
(45) Date of Patent: Mar. 1, 2011

(54) OPTICAL ELEMENT AND METHOD OF MANUFACTURING THE SAME

(75) Inventors: Tsuneyuki Ejima, Osaka (JP); Takayuki Hirose, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/465,680

(22) Filed: May 14, 2009

(65) Prior Publication Data

US 2009/0284820 A1 Nov. 19, 2009

(30) Foreign Application Priority Data

May 16, 2008 (JP) .............................. 2008-128961
May 12, 2009 (JP) .............................. 2009-115068

(51) Int. Cl.
*G02B 26/00* (2006.01)

(52) U.S. Cl. ...................................... 359/237; 359/253

(58) Field of Classification Search .................. 359/237
See application file for complete search history.

(56) References Cited

U.S. PATENT DOCUMENTS

| 4,988,627 | A | 1/1991 | Smith-Lewis | ............... 436/165 |
|---|---|---|---|---|
| 5,908,721 | A | 6/1999 | Emoto et al. | ................... 430/7 |
| 7,485,347 | B2 | 2/2009 | Masuda et al. | .............. 427/466 |
| 2005/0112294 | A1 | 5/2005 | Masuda et al. | .............. 427/555 |
| 2005/0186403 | A1* | 8/2005 | Seki et al. | ................ 428/195.1 |
| 2006/0172082 | A1 | 8/2006 | Masuda | ...................... 427/532 |
| 2006/0255720 | A1 | 11/2006 | Hirai et al. | ................... 313/503 |

FOREIGN PATENT DOCUMENTS

| JP | 2003-272840 | 9/2003 |
|---|---|---|
| JP | 2004-158815 | 6/2004 |
| JP | 2007-90134 | 4/2007 |
| JP | 2007-526599 | 9/2007 |
| JP | 2007-275732 | 10/2007 |
| WO | WO2005/076386 | 8/2005 |

* cited by examiner

*Primary Examiner*—Ricky L Mack
*Assistant Examiner*—James C Jones
(74) *Attorney, Agent, or Firm*—Steptoe & Johnson LLP

(57) ABSTRACT

Ink having the optimum contact angle relative to a partition wall is selected for forming a pixel, based on the relationship with an inclination angle of the partition wall. The ink applied to the opening of the partition wall is dried to form the pixel such that an outer edge in contact with the partition wall has a thickness of at least 35% of the maximum height of the partition wall and a difference between the maximum thickness and the average thickness and a difference between the minimum thickness and the average thickness are not larger than 35% of the average thickness in an effective pixel area.

4 Claims, 9 Drawing Sheets

OPTICAL ELEMENT AND METHOD OF MANUFACTURING THE SAME

FIELD OF THE INVENTION

The present invention relates to an optical element such as an electroluminescent element used for full-color display on a color television, a personal computer, a cellular phone, a car navigation system and the like, and a method of manufacturing the optical element by using an inkjet printing system or a die coating system.

BACKGROUND OF THE INVENTION

In the prior art, optical elements such as electroluminescent elements for full-color display have been used for image display panels of color televisions, personal computers, cellular phones, car navigation systems and the like. Such an optical element includes a plurality of luminescent layers which are laterally disposed. One of the significant structural requirements of the optical elements is a luminescent layer having an even thickness. For example, Japanese Patent Laid-Open No. 2002-148429 and Japanese Patent Laid-Open No. 2003-272840 describe that an even thickness is obtained by specifying a contact angle of film forming ink.

FIGS. 8 and 9 are structural diagrams showing an optical element of the prior art described in Japanese Patent Laid-Open No. 2002-148429. FIG. 8 is a schematic plan view showing the optical element from above. FIG. 9 is a schematic sectional view showing the optical element along the normal of a substrate. In FIGS. 8 and 9, reference numeral 1 denotes the substrate, reference numeral 2 denotes a partition wall, reference numeral 3 denotes a pixel, and reference numeral 4 denotes a similar figure area at the center of the pixel. The similar figure area 4 is disposed at the center of the pixel 3 and has an area occupying 80% of the area of the pixel 3. Further, in FIGS. 8 and 9, reference character T denotes the maximum thickness of the partition wall 2, reference character te denotes the thickness of the outer edge of the pixel 3, reference character tmax denotes the maximum thickness of the pixel 3 in the similar figure area 4, and reference character tmin denotes the minimum thickness of the pixel 3 in the similar figure area 4.

In the prior art, the thickness te of the outer edge of the pixel 3 is at least 80% of the maximum thickness T of the partition wall 2. In the similar figure area 4 which is disposed at the center of the pixel 3 and has an area occupying 80% of the area of the pixel 3, the average thickness of the pixel 3 is less than 80% of the maximum thickness T of the partition wall 2, and a difference between the maximum thickness tmax and the average thickness and a difference between the minimum thickness tmin and the average thickness are not larger than 25% of the average thickness.

In a first manufacturing method of the optical element according to the prior art, the adhesion of ink to the partition wall 2 during the shrinkage of the ink is distinctively increased by controlling the surface roughness of the partition wall 2. In a second manufacturing method, the adhesion of ink to the partition wall 2 during the shrinkage of the ink is distinctively increased by using a photosensitive resin composition as a material of the partition wall 2 and applying the ink when the photosensitive resin composition is not cured.

Moreover, in the manufacturing methods of the optical element according to the prior art, the surface of the partition wall 2 is made ink repellent by using plasma. Thus it is possible to prevent color mixture between adjacent pixels. The degree of ink repellency on the surface of the partition wall 2 is specified such that a contact angle measured using pure water is at least 90°. Further, an affinity for ink on the surface of the substrate 1 is specified such that a contact angle measured using pure water is not larger than 20°.

However, in the technique described in Japanese Patent Laid-Open No. 2002-148429 according to the prior art, an even thickness is obtained in the similar figure area 4 by specifying the contact angle of pure water. Thus the scope of the contact angle of pure water and the scope of the contact angle of an organic solvent may be different from each other, so that a preferably even thickness may not be obtained. Further, the contact angle of pure water relative to the partition wall is set at 90° or more and the contact angle of pure water relative to the substrate is set at 20° or less. For this reason, in the technique described in Japanese Patent Laid-Open No. 2002-148429 according to the prior art, the scope of a usable contact angle is disadvantageously small.

Japanese Patent Laid-Open No. 2003-272840 describes that an even thickness is obtained by imparting repellency to the surface of a partition wall such that ink has a receding contact angle of 29° to 45° when the partition wall has an inclination angle of about 70°. In the prior art described in Japanese Patent Laid-Open No. 2003-272840, however, the inclination angle of the partition wall is disadvantageously limited to about 70°.

Further, ink generally used for manufacturing the optical element and prepared by dissolving an organic compound into an organic solvent is disadvantageously dried with complicated behaviors resulting from a plurality of combined basic dry modes, as will be described later.

DISCLOSURE OF THE INVENTION

The present invention has been devised to solve the problems of the prior art. An object of the present invention is to provide an optical element and a method of manufacturing the same which can easily obtain a preferably even thickness with reliability in a wider range of the inclination angle of a partition wall and the contact angle of ink.

In order to attain the object, an optical element of the present invention is an optical element including a substrate, a partition wall formed on the substrate, and a pixel formed in the opening of the partition wall by drying ink applied to the opening, wherein the partition wall is inclined with an inclination angle of 50° to 80°, the ink has a contact angle not larger than 28° relative to the partition wall, and the pixel is formed such that an outer edge in contact with the partition wall has a thickness of at least 35% of the maximum height of the partition wall and a difference between the maximum thickness and the average thickness and a difference between the minimum thickness and the average thickness are not larger than 35% of the average thickness in an effective pixel area contributing to the display of the pixel.

Further, it is preferable that the partition wall is inclined with an inclination angle of 50° to 60°, the ink has a contact angle not larger than 22° relative to the partition wall, and the pixel is formed such that the outer edge in contact with the partition wall has a thickness of at least 95% of the maximum height of the partition wall.

A method of manufacturing an optical element according to the present invention is a method of manufacturing an optical element in which a pixel is formed in the opening of a partition wall by applying ink to the opening of the partition wall formed on a substrate and drying the ink, the method including the steps of: applying the ink to the opening of the partition wall inclined with an inclination angle of 50° to 80°, the ink having a contact angle not larger than 28° relative to the partition wall; and drying the applied ink to form the pixel such that an outer edge in contact with the partition wall has a thickness of at least 35% of the maximum height of the partition wall and a difference between the maximum thickness and the average thickness and a difference between the minimum thickness and the average thickness are not larger than 35% of the average thickness in an effective pixel area contributing to the display of the pixel.

Moreover, it is preferable that the ink is prepared by a solvent having a contact angle not larger than 22° relative to the partition wall, and the pixel is formed such that the outer edge in contact with the partition wall has a thickness of at least 95% of the maximum height of the partition wall in the opening of the partition wall inclined with an inclination angle of 50° to 60°.

According to a preferred embodiment of the present invention, it is possible to increase the range of the inclination angle of the partition wall for obtaining a preferably even thickness in the effective pixel area and the range of the contact angle of the ink. Thus in a wider range of the inclination angle of the partition wall and the contact angle of the ink, it is possible to easily obtain a preferably even thickness with reliability in the effective pixel area.

Therefore, the present invention is applicable to electronic devices such as an organic semiconductor requiring a uniform structure, and particularly applicable to electronic devices having thin films.

DESCRIPTION OF THE EMBODIMENTS

Figure 1:
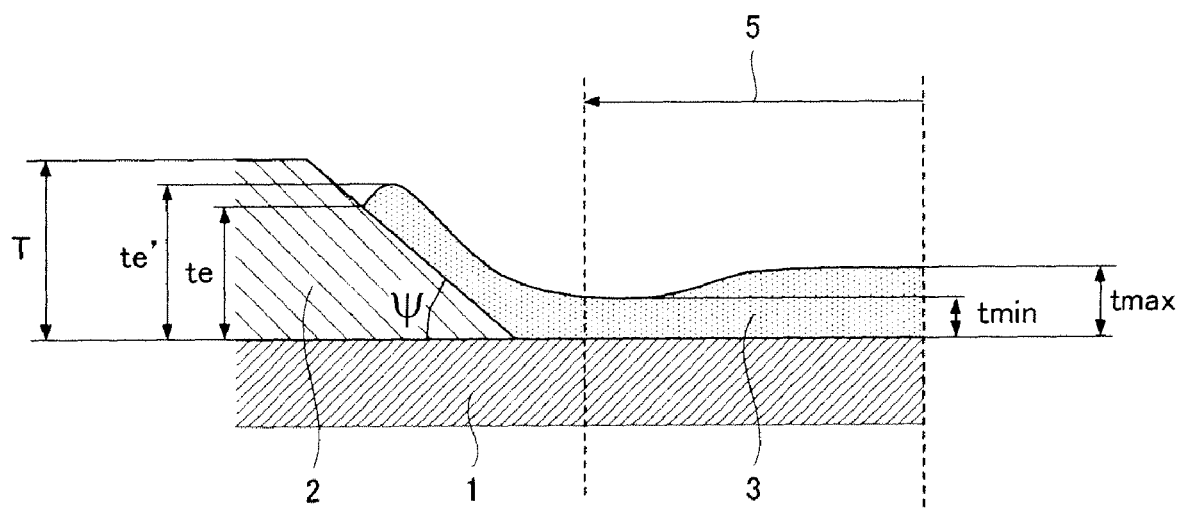
FIG. 1 is a schematic sectional view showing the structure of an optical element according to an embodiment of the present invention.

An embodiment of an optical element and a method of manufacturing the same according to the present invention will be specifically described below with reference to the accompanying drawings. Elements corresponding to the foregoing elements will be indicated by the same reference numerals and the explanation thereof is omitted when necessary.

Figure 8:
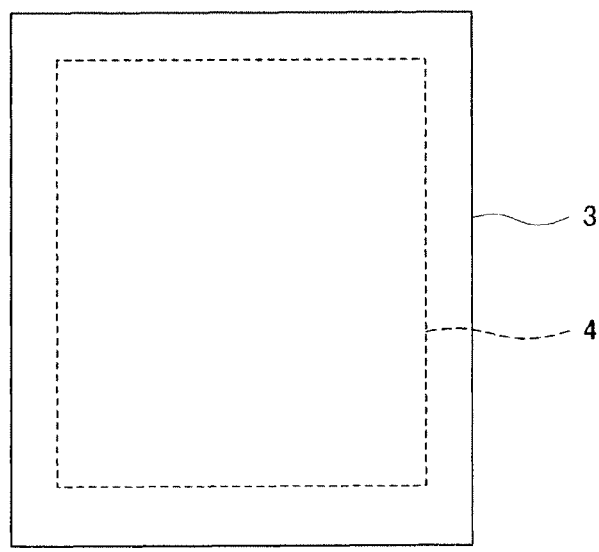
FIG. 8 is a schematic plan view showing an optical element of the prior art from above.
Figure 9:
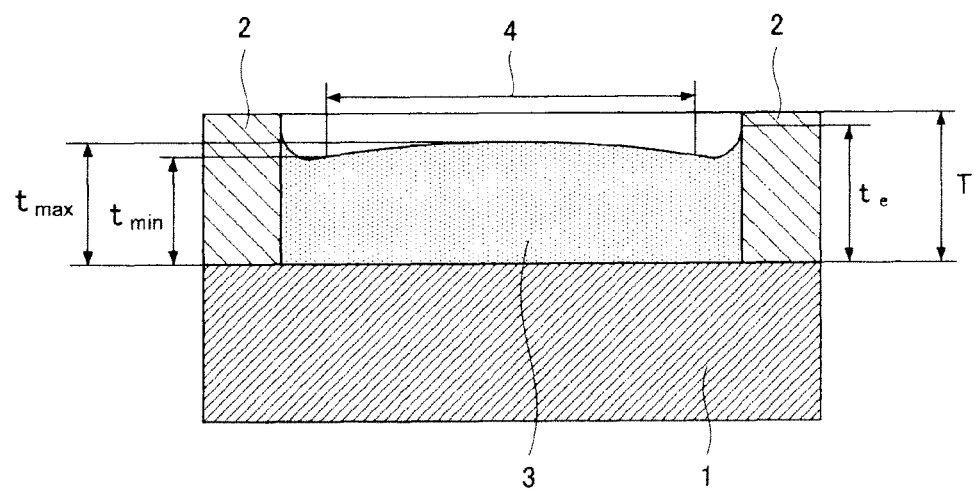
FIG. 9 is a schematic sectional view showing the optical element of the prior art along the normal of a substrate.

FIG. 1 is a schematic sectional view showing the structure of the optical element according to the present embodiment. The same constituent elements as the optical element shown in FIGS. 8 and 9 will be indicated by the same reference numerals and the explanation thereof is omitted. In FIG. 1, reference numeral 5 denotes an effective pixel area in a pixel 3. The effective pixel area 5 is disposed in a cell surrounded by a partition wall 2. The effective pixel area 5 is defined as a rectangular internal area which is partitioned by a line displaced inward by 3.5 µm from the bottom end of the partition wall 2, that is, from a joint of the partition wall 2 with a substrate 1. The effective pixel area 5 is a part for displaying an image on an image display panel.

The range of the effective pixel area 5 can be freely changed according to desired characteristics such as a resolution of a display. Generally, the substrate 1 is made of glass. The substrate 1 may be made of a plastic as long as desired transparency and mechanical characteristics are satisfied. Moreover, the substrate 1 may undergo surface treatment such as plasma treatment and UV treatment.

The partition wall 2 is arranged on the substrate 1 and is trapezoidal in cross section with a long side on the substrate side. The inclination angle of the partition wall 2 can be freely changed according to desired characteristics such as a resolution of the display. The partition wall 2 is made of a material such as acrylic resin, polyimide resin, and novolac phenol resin in consideration of insulation, resistance to organic solvents, and resistance to the processes of plasma treatment, etching, and baking. The partition wall 2 may also undergo surface treatment such as plasma treatment and UV treatment.

Organic compounds used as fluorescent materials constituting the pixel 3 are not particularly limited but materials such as polyphenylene vinylene, polyallylene, poly(alkylthiophene), and poly(alkylfluorene) may be used. The pixel 3 is generally formed by drying ink having been prepared by dissolving an organic compound into an organic solvent.

Ink is generally applied using inkjet printing system. Ink may be applied using die coating system through a slit member and a method for applying ink is not particularly limited. Further, an organic solvent capable of dissolving at least 0.1 wt % of the fluorescent material is used. For example, alkylbenzene, alkoxybenzene, toluene, xylene, alcohol, and so on are used. A solvent prepared by mixing at least two organic solvents may be used.

Figure 2:
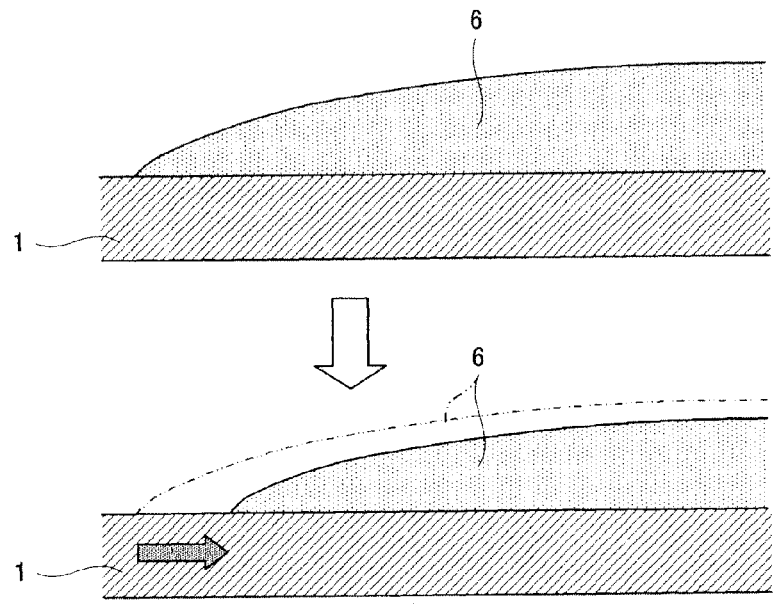
FIG. 2 is a schematic diagram showing a drying behavior of ink in CCA mode in a method of manufacturing the optical element according to the embodiment of the present invention.
Figure 3:
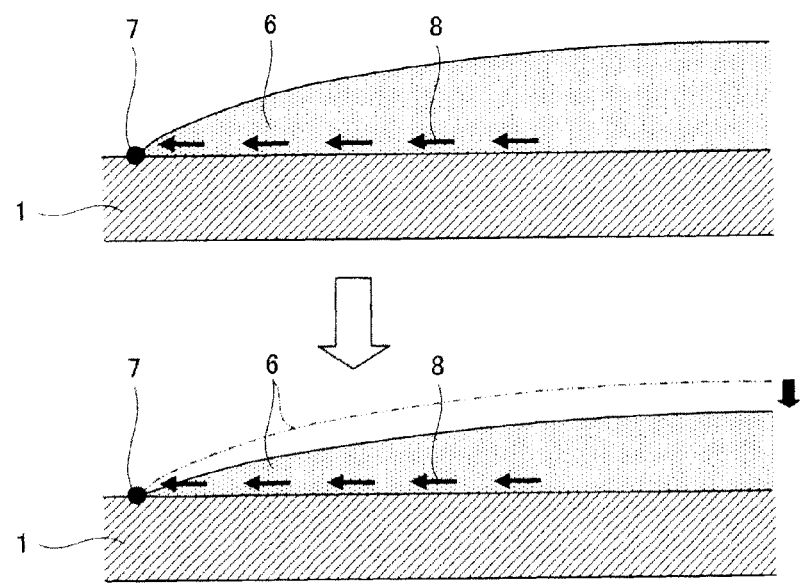
FIG. 3 is a schematic diagram showing a drying behavior of the ink in CCR mode in the method of manufacturing the optical element according to the embodiment of the present invention.

The pixel 3 is formed by applying ink to the opening of the partition wall 2, drying the applied ink, and completely evaporating the solvent of the ink. In the drying process of the ink for forming the pixel 3, the solvent exhibits a plurality of drying behaviors. FIGS. 2 and 3 show two basic behaviors.

In one droplet drying behavior, a droplet 6 is dried with one end unrestricted as shown in FIG. 2. The droplet 6 is evenly evaporated and thus the volume of the droplet 6 decreases while keeping a similar figure. This drying behavior is a state of nature. Since the droplet 6 is deformed with a constant contact angle, this droplet drying behavior is called constant contact angle (CCA) mode.

In the other droplet drying behavior, the droplet 6 is dried with a droplet end 7 restricted as shown in FIG. 3. In this case, a different state from the state of nature occurs. In other words, a solvent flow 8 to the droplet end 7 is generated in the droplet and a decrease in the volume of the droplet end 7 is compensated by a solvent from the inside of the droplet, so that the volume of the droplet end 7 is not reduced by drying. Since the droplet end 7 is fixed, that is, the droplet 6 is deformed without changing the droplet diameter, the droplet drying behavior is called constant contact radius (CCR) mode.

Figure 4:
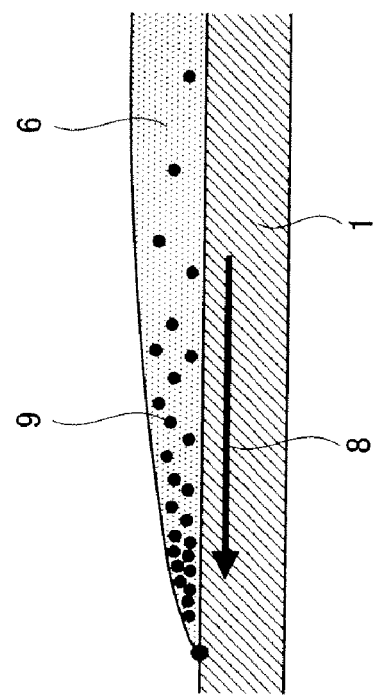
FIG. 4 is a schematic diagram showing a movement of the solute of the ink in CCR mode in the method of manufacturing the optical element according to the embodiment of the present invention.
Figure 4:
Figure 4:
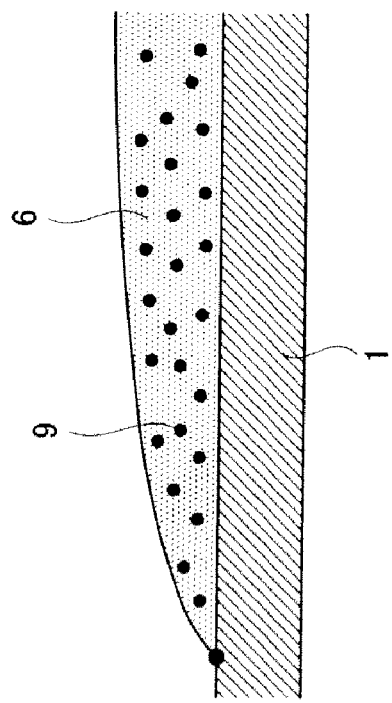
Figure 5:
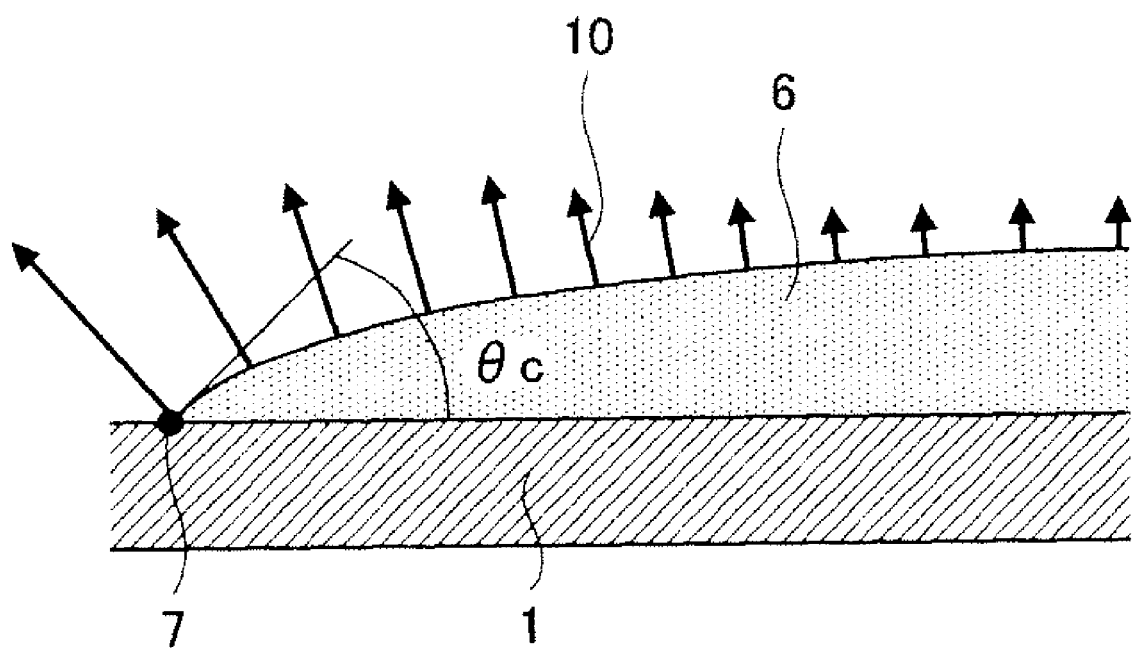
FIG. 5 is a schematic diagram showing the evaporation rate of the ink in CCR mode in the method of manufacturing the optical element according to the embodiment of the present invention.

In CCR mode, as shown in FIG. 4, a solute 9 moves along the solvent flow 8 to the droplet end 7 and thus the concentration of the solute increases on the droplet end 7. Further, in CCR mode, as shown in FIG. 5, evaporation rates 10 on the surface of the droplet 6 are not uniform unlike in CCA mode, and the evaporation rates 10 are distributed so as to rapidly increase as being closer to the droplet end 7. The specificity of the evaporation rates 10 on the droplet end 7 increases as a contact angle $\theta c$ of the droplet 6 decreases. Further, the rate of the solvent flow 8 to the droplet end 7 also increases with the evaporation rates 10 as being closer to the droplet end 7.

Referring to FIGS. 6A to 6H, the following will specifically describe ink drying behaviors after the ink is applied.

Figure 6A:
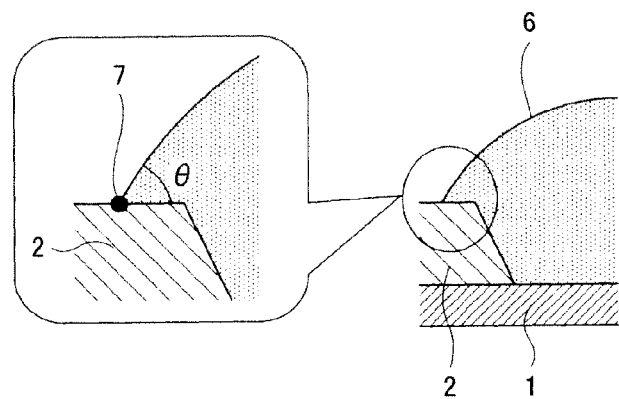
FIG. 6A is a schematic diagram showing a part of an ink drying process in the method of manufacturing the optical element according to the embodiment of the present invention.

FIG. 6A shows a state immediately after the ink is applied. The ink is applied to the top surface of the partition wall 2 without being mixed with adjacent ink.

Immediately after the application, a contact angle $\theta$ of the droplet end 7 is formed by the equilibrium of the surface tension of the droplet end 7 and a difference between the interfacial tension of the droplet end 7 and the interfacial tension of the partition wall 2. Next, when drying is started, the droplet end 7 is not moved and the contact angle decreases ($\theta \rightarrow \theta R$) with the evaporation of the solvent as shown in FIG. 6B while the equilibrium of the surface tension is kept on the droplet end 7.

Figure 6B:
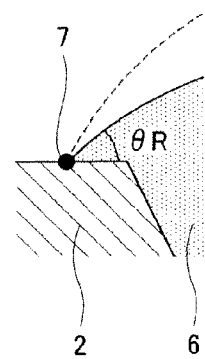
FIG. 6B is a schematic diagram showing a part of the ink drying process in the method of manufacturing the optical element according to the embodiment of the present invention.
Figure 6C:
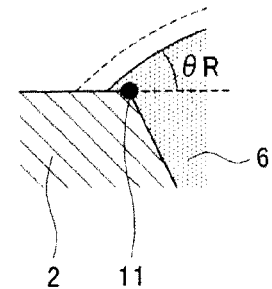
FIG. 6C is a schematic diagram showing a part of the ink drying process in the method of manufacturing the optical element according to the embodiment of the present invention.

When the equilibrium of the surface tension on the droplet end 7 is lost, a tensile stress into the droplet 6 is generated and thus the solvent of the droplet 6 is evaporated while keeping the constant contact angle $\theta R$, so that the droplet diameter decreases as shown in FIG. 6C. The contact angle with the lost equilibrium is a receding contact angle. $\theta R$ in Table 1, which will be described later, is equivalent to the receding contact angle.

Figure 6D:
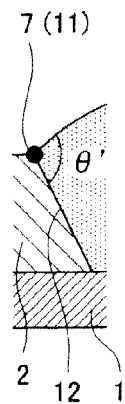
FIG. 6D is a schematic diagram showing a part of the ink drying process in the method of manufacturing the optical element according to the embodiment of the present invention.

The droplet diameter changes until the droplet end 7 reaches an edge 11 of the partition wall 2. As shown in FIG. 6D, when the droplet end 7 reaches the edge 11 of the partition wall 2, the reference of the contact angle changes from the top surface of the partition wall 2 to a side 12 of the partition wall 2 and thus the contact angle temporarily increases ($\theta'$) and becomes larger than the receding contact angle $\theta R$, so that the surface tension on the droplet end 7 restores the equilibrium. As a result, as shown in FIG. 6E, the droplet end 7 is fixed on the edge 11 of the partition wall 2 and the contact angle of the droplet end 7 decreases ($\theta \rightarrow \theta R$) with the progress of drying.

Figure 6E:
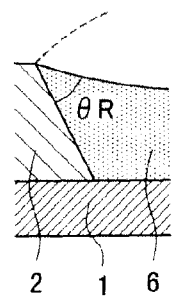
FIG. 6E is a schematic diagram showing a part of the ink drying process in the method of manufacturing the optical element according to the embodiment of the present invention.
Figure 6F:
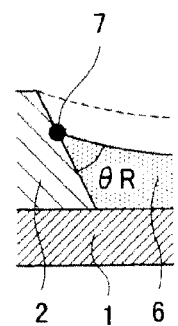
FIG. 6F is a schematic diagram showing a part of the ink drying process in the method of manufacturing the optical element according to the embodiment of the present invention.

As shown in FIGS. 6B and 6E, in the progress of drying with the fixed droplet end 7, the solvent flow 8 is generated from the center of the droplet to the droplet end. After that, when the contact angle decreases to the receding contact angle, the volume of the droplet 6 decreases with the progress of drying as shown in FIGS. 6C and 6F while keeping the constant contact angle $\theta R$.

As has been discussed, in the progress of drying while the contact angle is kept constant, the solvent flow 8 to the droplet end 7 is not generated in the droplet, so that the solute 9 does not move to the droplet end 7. However, the volume of the droplet is reduced by the evaporation of the solvent, so that the concentration of the solute 9 on the droplet end 7 increases with the progress of drying.

Figure 6G:
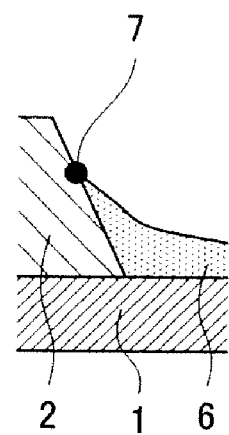
FIG. 6G is a schematic diagram showing a part of the ink drying process in the method of manufacturing the optical element according to the embodiment of the present invention.
Figure 6H:
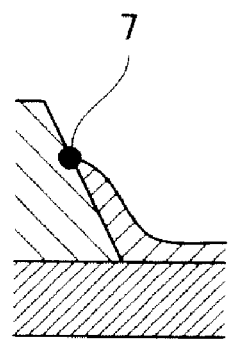
FIG. 6H is a schematic diagram showing a part of the ink drying process in the method of manufacturing the optical element according to the embodiment of the present invention.

When the concentration of the solute 9 on the droplet end 7 reaches a critical concentration, the solute 9 gels and the droplet end 7 is fixed as shown in FIG. 6G. This fixation is generally called self-pinning. After self-pinning, the ink reaches the final drying state shown in FIG. 6H with the fixed droplet end 7.

As has been discussed, the solvent is dried so as to repeat CCR mode and CCA mode. The smaller the receding contact angle $\theta R$, the higher the self-pinning position. This is because the smaller the contact angle, the higher the evaporation rate 10 with the fixed droplet end 7 as has been discussed, so that the rate of the solvent flow 8 to the droplet end 7 increases and facilitates gathering of the solute on the droplet end 7. When the contact angle is small, the concentration of the solute on the droplet end 7 may have reached the critical concentration in a state in which the contact angle of the droplet end 7 reaches the receding contact angle as shown in FIG. 6E. In this case, the drying behavior shifts to the process of FIG. 6G without passing through the process of FIG. 6F.

It is desirable that the pixel 3 have a preferably even thickness in the effective pixel area 5. To be specific, it is desirable that a difference between the maximum thickness tmax and the average thickness in the area 5 and a difference between the minimum thickness tmin and the average thickness be 35% or less of the average thickness.

Further, when an outer region from the outer edge of the effective pixel area 5 to the partition wall 2 has a small thickness, electrodes arranged on the substrate 1 may be short-circuited. In order to prevent a short circuit, the thickness te on the outer edge of the pixel 3, that is, the height of the self-pinning position has to be set at least 35% of the height of the partition wall 2. It is the most suitable to set the thickness te at least 95% of the height of the partition wall 2.

The maximum thickness te' in the outer region may be larger than the thickness of the outer edge of the effective pixel area 5 as long as an even thickness as a requirement is satisfied in the effective pixel area 5. The shape of the pixel 3 in cross section is not particularly limited in the outer region of the pixel 3.

Figure 7:
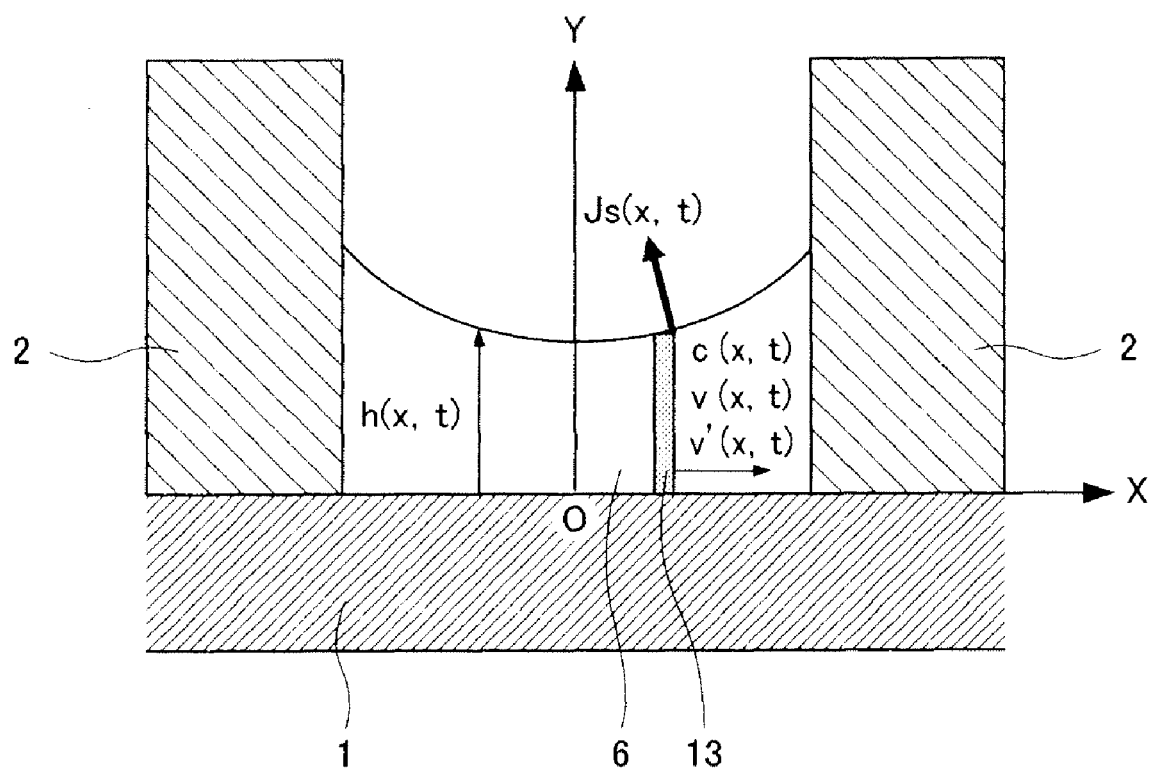
FIG. 7 is an explanatory drawing showing the parameters of numerical analysis expressions for the thickness of a pixel in the optical element according to the embodiment of the present invention.

The following will describe a numerical simulation for examining the relationship between an inclination angle Ψ of the partition wall satisfying the foregoing requirements and the receding contact angle θR of the ink. FIG. 7 shows the outline of a simulation model. In this simulation, the partition wall 2 is symmetrical as shown in FIG. 7. Moreover, the point of intersection of the center line and the substrate 1 is origin O(0, 0), X coordinates are set in parallel with the substrate 1, and y coordinates are set perpendicularly to the substrate 1. Fundamental equations for the droplet 6 deformed in CCR mode are three expressions which express the mass conservation of the solvent and the solute 9 as below:

(Expression 1)

$$\rho \frac{\partial h}{\partial t} = -\rho \frac{1}{r} \frac{\partial}{\partial r}(rhv) - J_S(r,t) \sqrt{1 + \left(\frac{\partial h}{\partial r}\right)^2} \quad (1)$$

(Expression 2)

$$\frac{\partial}{\partial t}(ch) = -\frac{1}{r} \frac{\partial}{\partial r}(rchv') \quad (2)$$

(Expression 3)

$$v' = v - \frac{Ds}{c} \frac{\partial c}{\partial r} \quad (3)$$

In these expressions, h(r, t) represents the height of the droplet on x coordinate r at time t. Similarly c(r, t), v(r, t), Js(r, t), and v'(r, t) represent the concentration of the solute, the flow rate of the solvent, the evaporation rate of the solvent, and the rate of the solute of a tiny region 13 in the droplet and are all functions of the x coordinate r and time t. ρ is the density of the solvent and Ds is the diffusion coefficient of the solute in the solvent.

In these expressions, it is assumed that the height of the droplet is sufficiently smaller than the diameter of the droplet and c, v, and v' are uniform in the height direction. The influence of gravity is ignored.

In expression (1), the mass conservation of the solvent is expressed by the height of the droplet. Expression (1) indicates that the time variation of a droplet height h on the x coordinate r is equal to the sum of a reduction in droplet height when the solvent moves with a flow rate v on the position r and a reduction in droplet height when the solvent evaporates on the surface of the droplet.

Expression (2) indicates the mass conservation of the solute 9. Expression (3) indicates that the rate v' of the solute 9 in the solvent is obtained by adding a term to the flow rate v of the solvent in consideration of the influence of the diffusion of the solute 9. In expression (2), ch on the left side indicates the mass of the solute on the x coordinate r and chv' on the right side indicates the mass of the solute 9 moving on the x coordinate r. Expression (2) indicates that ch on the position r decreases with time and the reduction of ch is equal to chv' on the position r. In other words, according to expression (2), since the mass of the solute is not exchanged between the droplet and the outside (gas phase) of the droplet, the total sum of the mass of the solute 9 does not change even if the solute moves in the droplet with time.

As has been discussed, after the ink is applied, the ink is dried by repeating CCR mode and CCA mode. In CCR mode, the droplet end 7 is restricted as a boundary condition. An evaporation rate Js has specificity that increases as being closer to the droplet end 7, and the specificity increases as the contact angle of the droplet end 7 decreases.

By solving expressions (1) to (3) on the condition that the droplet end 7 is fixed, the process of reducing the contact angle of the droplet end 7 can be reproduced. While the droplet is dried in CCR mode, the droplet height is reduced by the evaporation of the solvent. Since the solvent flow 8 to the droplet end 7 is generated for the foregoing reason, the solute 9 moves to the droplet end 7 along the flow during the generation of the flow. Thus the concentration of the solute on the droplet end 7 increases with time. When the contact angle decreases to the receding contact angle θR of the ink, the drying behavior shifts to CCA mode. Alternatively, when the concentration of the solute on the droplet end 7 reaches the critical value, the drying process is continued in CCR mode with the fixed droplet end 7 and is completed when the solvent disappears.

In CCA mode, the evaporation rate 10 from the surface is kept constant and the volume of the droplet decreases with a similar figure while keeping the contact angle of the droplet end 7 at a constant value. Meanwhile, the solvent flow 8 to the droplet end 7 is not generated but a reduction in the overall volume of the droplet increases the concentration of the solute over the droplet, so that the concentration of the droplet end 7 also increases. When the concentration of the solute on the droplet end 7 reaches a critical value, the droplet end 7 is fixed by the gelation of the solute 9. Thus the drying behavior shifts to CCR mode.

The drying process can be reproduced by an analysis through repeated calculations in the two modes. When the ink is applied to the top surface of the partition wall 2, the drying behavior starts from CCR mode. After that, when the contact angle reaches the receding contact angle θR, the drying behavior shifts to CCA mode and the droplet end 7 moves on the top surface of the partition wall 2. When the droplet end 7 reaches the edge 11 of the partition wall 2, the drying behavior shifts to CCR mode. When the contact angle reaches the receding contact angle θR, the drying behavior shifts to CCA mode and the droplet end 7 moves on the side 12 of the partition wall 2. When the concentration of the solute on the droplet end 7 reaches the critical concentration, the drying behavior shifts to CCR mode, so that the drying process is completed. By a numerical analysis on the evaporation of the solvent and the movement of the solute 9 by the evaporation, the results of Table 1 were obtained.

In Table 1, reference character T represents the inclination angle of the partition wall 2 and reference character θR represents the receding contact angle of the ink. In Table 1, combinations of Ψ and θR are judged to be poor, fair, good, and excellent. "Poor" combinations do not satisfy one of a first requirement and a second requirement. The first requirement is that a difference between the maximum thickness and the average thickness in the effective pixel area 5 and a difference between the minimum thickness and the average thickness should be 35% or less of the average thickness. The second requirement is that the thickness of the outer edge of the pixel 3, that is, the height of the self-pinning position should be at least 35% of the height of the partition wall 2. "Fair" combinations satisfy the first requirement but the height of the self-pinning position is less than 35% of the height of the partition wall 2. "Good" combinations satisfy both of the two requirements. "Excellent" combinations are the optimum combinations satisfying both of the two requirements and the height of the self-pinning position is at least 95% of the height of the partition wall 2.

As shown in Table 1, on the partition wall 2 having an inclination angle Ψ of 50° to 80°, the pixel 3 is formed with the ink having a receding contact angle θR of 5° to 28°, so that an even thickness is obtained in the effective pixel area 5 and short circuits can be prevented on the electrodes arranged on the substrate 1. Particularly on the partition wall 2 having an inclination angle Ψ of 50° to 60°, the pixel 3 is formed with the ink having a receding contact angle θR of 5° to 22°, so that During the application of ink, the ink may be disadvantageously mixed depending upon a distance between adjacent pixels. In this case, ink having a large contact angle is used or surface treatment is performed on the partition wall to increase the contact angle. Table 1 shows that the contact angle can be increased up to 28°. Also in this case, the self-pinning position can be kept at about 35% of the height of the partition wall and thus it is possible to prevent short circuits on the electrodes.

TABLE 1

| | | RECEDING CONTACT ANGLE θR DEGREES | | | | | | | | | | | | | | |
|---|---|---|---|---|---|---|---|---|---|---|---|---|---|---|---|---|
| | | 5 to 20 | 21 | 22 | 23 | 24 | 25 | 26 | 27 | 28 | 29 | 30 | 31 | 32 | 33 | 34 | 35 |
| INCLINATION ANGLE Ψ DEGREES | 50 | E | E | E | G | G | G | G | G | G | F | F | P | P | P | P | P |
| | 60 | E | E | E | G | G | G | G | G | G | F | F | F | F | F | F | F |
| | 70 | | | | | G | | | | | | | | F | | | |
| | 80 | | | | | G | | | | | | | | F | | | |
| | 90 | | | | | | | | | F | | | | | | | |

| | | RECEDING CONTACT ANGLE θR DEGREES | | | | | | | | | | | | | | |
|---|---|---|---|---|---|---|---|---|---|---|---|---|---|---|---|---|
| | | 36 | 37 | 38 | 39 | 40 | 41 | 42 | 43 | 44 | 45 | 46 | 47 | 48 | 49 | 50 | 60 |
| INCLINATION ANGLE Ψ DEGREES | 50 | | | | | | | P | | | | | | | | | |
| | 60 | F | F | P | P | P | P | P | P | P | P | P | P | P | P | P | P |
| | 70 | F | F | F | F | F | F | F | F | F | F | F | P | P | P | P | P |
| | 80 | F | F | F | F | F | F | F | F | F | F | F | F | F | F | P | P |
| | 90 | F | F | F | F | F | F | F | F | F | F | F | F | F | F | P | P | the combination of the inclination angle of the partition wall 2 and the receding contact angle of the ink is the most suitable combination that satisfies a preferably even thickness in the effective pixel area 5 and allows the outer edge of the pixel 3 to have a thickness of at least 95% of the height of the partition wall. When the receding contact angle θR of the ink is less than 5°, the receding contact angle of the ink cannot be measured.

According to Japanese Patent Laid-Open No. 2002-148429, it is desirable that pure water have a contact angle of at least 90° relative to the partition wall and have a contact angle not larger than 20° relative to the substrate, whereas the present embodiment proved that even ink having a contact angle of at least 20° can achieve a preferably even thickness. Further, in Japanese Patent Laid-Open No. 2003-272840, the inclination angle of the partition wall is limited to about 70°, whereas the present embodiment proved that even the partition wall having an inclination angle of 50° to 80° can achieve a preferably even thickness.

After the detailed examination of the drying behavior of ink on the condition that the partition wall 2 has an inclination angle, it was proved that a preferably even thickness can be obtained by a configuration other than the configurations of the prior art described in Japanese Patent Laid-Open No. 2002-148429 and Japanese Patent Laid-Open No. 2003-272840.

For example, water based ink for a hole injection layer of an organic EL, anisole ink used for an interlayer, and alkoxybenzene ink used for a luminescent layer have receding contact angles smaller than 20° as compared with glass used as a material of the substrate 1 and many resins used as materials of the partition wall 2. Thus according to the analysis results of Table 1, it is possible to obtain a preferably even thickness in the effective pixel area when the partition wall 2 has an inclination angle Ψ of 50° to 80°.

What is claimed is:

1. An optical element comprising a substrate, partition walls on the substrate, an opening surrounded by the partition walls, and a pixel of dried ink in the opening, wherein each of the partition walls is inclined with an inclination angle of 50° to 80°, the ink has a receding contact angle not larger than 28° relative to the partition walls, and the pixel has an outer edge in contact with the partition walls, the outer edge having a thickness of at least 35% of a maximum height of the partition walls, a difference between a maximum thickness 1 and an average thickness and a difference between a minimum thickness and the average thickness are not larger than 35% of the average thickness in an effective pixel area contributing to display of the pixel, and a thickness of an outer periphery in the effective pixel area is thinner than a thickness of an area inside the outer periphery in the effective pixel area.

2. The optical element according to claim 1, wherein each of the partition walls is inclined with an inclination angle of 50° to 60°, the ink has a receding contact angle not larger than 22° relative to the partition walls, and the pixel has an outer edge in contact with the partition walls, the outer edge having a thickness of at least 95% of the maximum height of the partition walls.

3. A method of manufacturing an optical element in which a pixel is formed in an opening by applying ink to the opening and drying the ink, the opening surrounded by partition walls formed on a substrate, the method comprising:

applying the ink to the opening to overflow top surfaces of the partition walls each inclined with an inclination angle of 50° to 80°, the ink having a receding contact angle not larger than 28° relative to the partition walls; and drying the applied ink to form the pixel such that an outer edge in contact with the partition walls has a thickness of at least 35% of a maximum height of the partition walls, a difference between a maximum thickness and an average thickness and a difference between a minimum thickness and the average thickness are not larger than 35% of the average thickness in an effective pixel area contributing to display of the pixel, and a thickness of an outer periphery in the effective pixel area is thinner than a thickness of an area inside the outer periphery in the effective pixel area.

4. The method of manufacturing an optical element according to claim 3, wherein the ink is prepared by a solvent having a receding contact angle not larger than 22° relative to the partition walls, and the pixel is formed in the opening surrounded by the partition walls which are inclined with an inclination angle of 50° to 60° such that the outer edge in contact with the partition walls has a thickness of at least 95% of the maximum height of the partition walls.

* * * * *